(12) United States Patent
Matsuoka

(10) Patent No.: US 9,202,034 B2
(45) Date of Patent: *Dec. 1, 2015

(54) LOGIN TO A COMPUTING DEVICE BASED ON FACIAL RECOGNITION

(71) Applicant: GOOGLE INC., Mountain View, CA (US)

(72) Inventor: Yoshimichi Matsuoka, Cupertino, CA (US)

(73) Assignee: Google Inc., Mountain View, CA (US)

( * ) Notice: Subject to any disclaimer, the term of this patent is extended or adjusted under 35 U.S.C. 154(b) by 47 days.

This patent is subject to a terminal disclaimer.

(21) Appl. No.: 14/079,338

(22) Filed: Nov. 13, 2013

(65) Prior Publication Data

US 2014/0075528 A1    Mar. 13, 2014

Related U.S. Application Data

(63) Continuation of application No. PCT/US2012/049760, filed on Aug. 6, 2012, which is a continuation of application No. 13/247,652, filed on Sep. 28, 2011, now Pat. No. 8,261,090.

(51) Int. Cl.
  *G06F 21/00* (2013.01)
  *G06F 21/32* (2013.01)

(52) U.S. Cl.
  CPC ....................................... *G06F 21/32* (2013.01)

(58) Field of Classification Search
  CPC ....................................................... G06F 21/32
  USPC .............. 726/2–3, 17, 26; 713/182–183, 186; 382/115, 118, 218
  See application file for complete search history.

(56) References Cited

U.S. PATENT DOCUMENTS

| 7,308,581 B1 | 12/2007 | Geosimonian |
| 8,457,367 B1* | 6/2013 | Sipe et al. ..................... 382/118 |
| 2004/0151347 A1 | 8/2004 | Wisniewski |
| 2004/0158724 A1 | 8/2004 | Carr et al. |
| 2006/0285659 A1 | 12/2006 | Suryanarayana et al. |
| 2007/0174272 A1 | 7/2007 | Carter et al. |
| 2007/0198850 A1* | 8/2007 | Martin et al. ................. 713/186 |
| 2008/0109895 A1 | 5/2008 | Janevski |
| 2009/0077653 A1 | 3/2009 | Osborn et al. |
| 2011/0067098 A1 | 3/2011 | Nelson et al. |
| 2011/0206244 A1 | 8/2011 | Munoz-Bustamante |
| 2011/0252332 A1 | 10/2011 | Lee et al. |

FOREIGN PATENT DOCUMENTS

| JP | 1125040 A | 1/1999 |
| JP | 2003067339 A | 3/2003 |
| JP | 2003233816 A | 8/2003 |
| JP | 2006340346 A | 12/2006 |
| JP | 2007058357 A | 3/2007 |
| JP | 2007114931 A | 5/2007 |
| JP | 2007133845 A | 5/2007 |

* cited by examiner

*Primary Examiner* — Venkat Perungavoor
*Assistant Examiner* — Amir Mehramesh
(74) *Attorney, Agent, or Firm* — McDermott Will Emery LLP

(57) ABSTRACT

A method of logging a first user in to an computing device includes receiving a an image of the first user via a camera operably coupled with the computing device and determining an identity of the first user based on the received image. If the determined identity matches a predetermined identity, then, based at least on the identity of the first user matching the predetermined identity, the first user is logged in to the computing device.

18 Claims, 10 Drawing Sheets

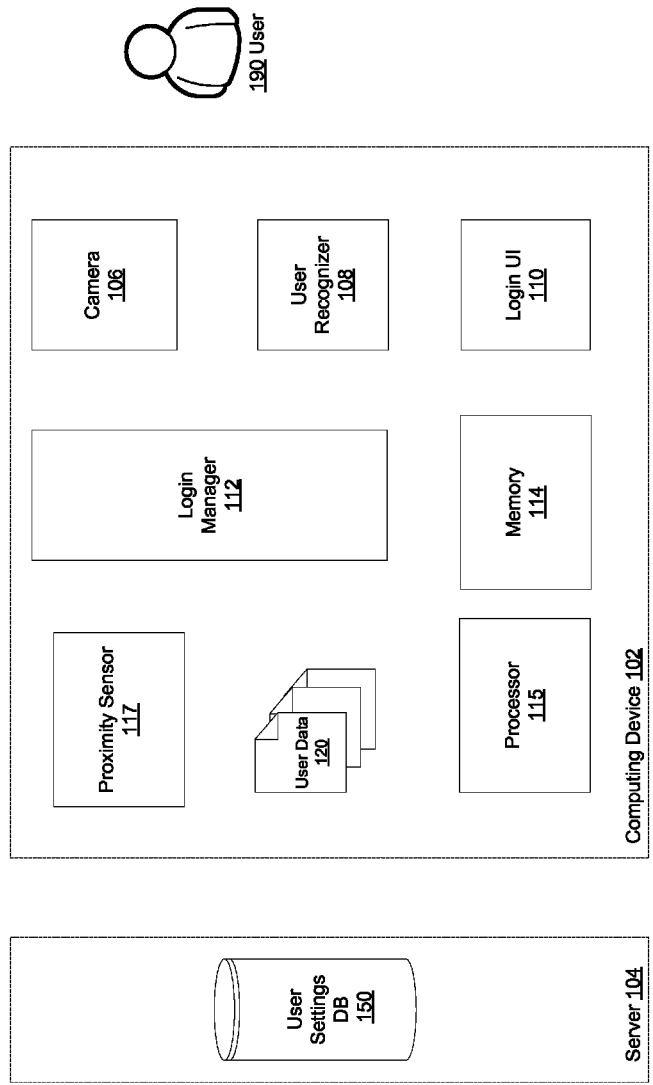

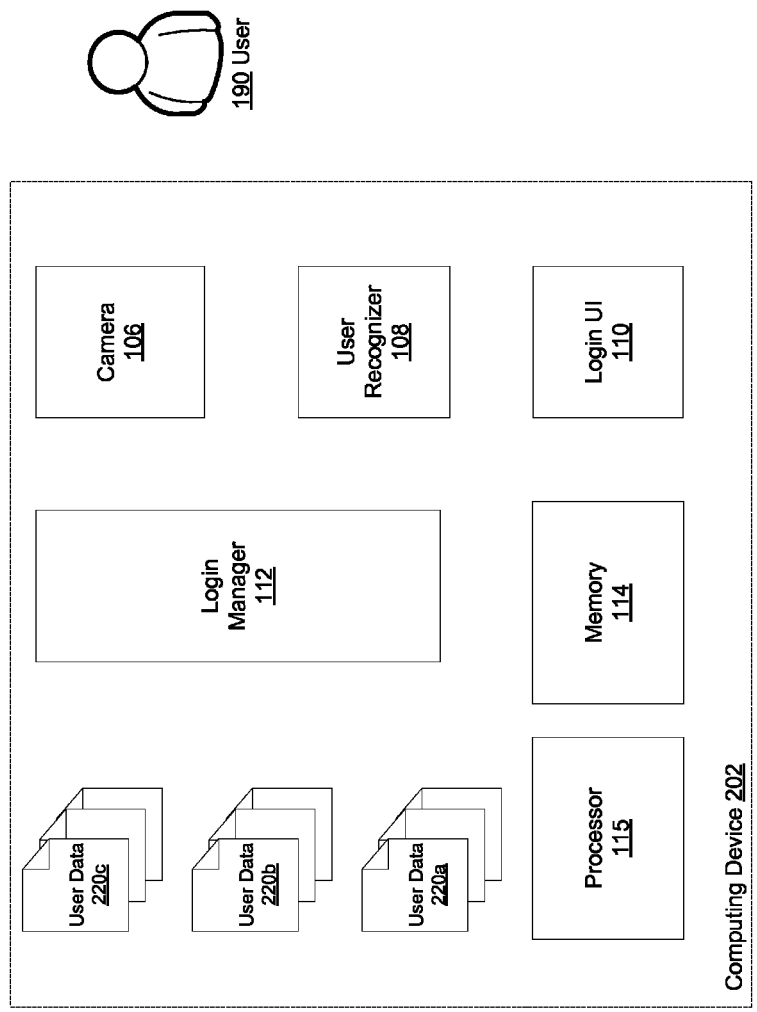

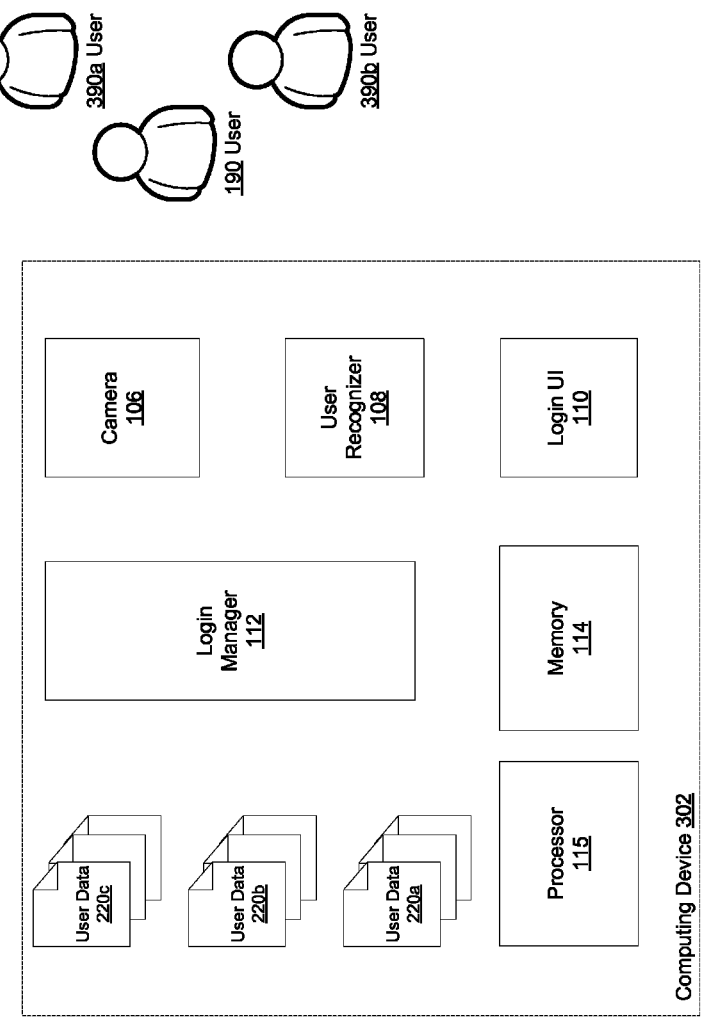

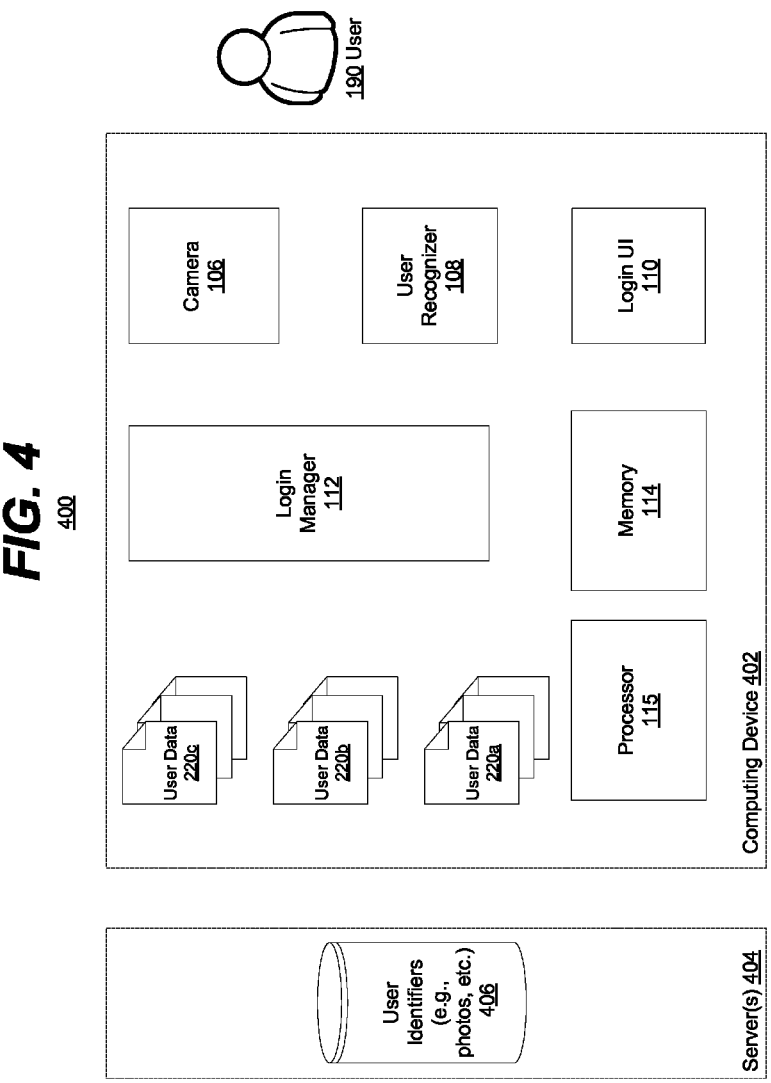

500

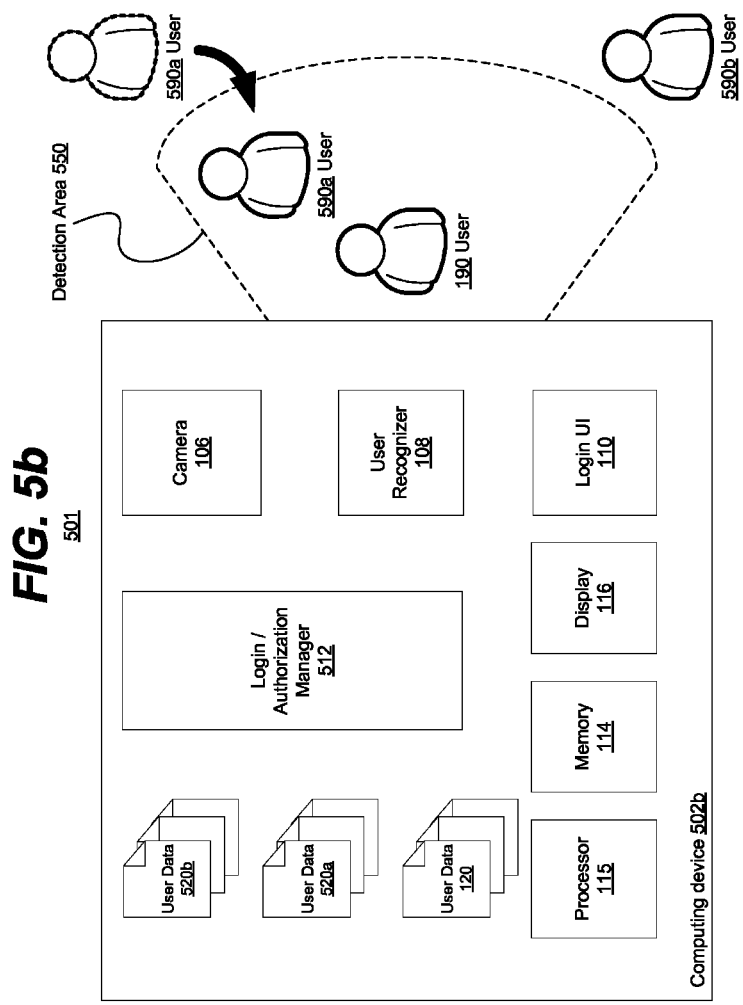

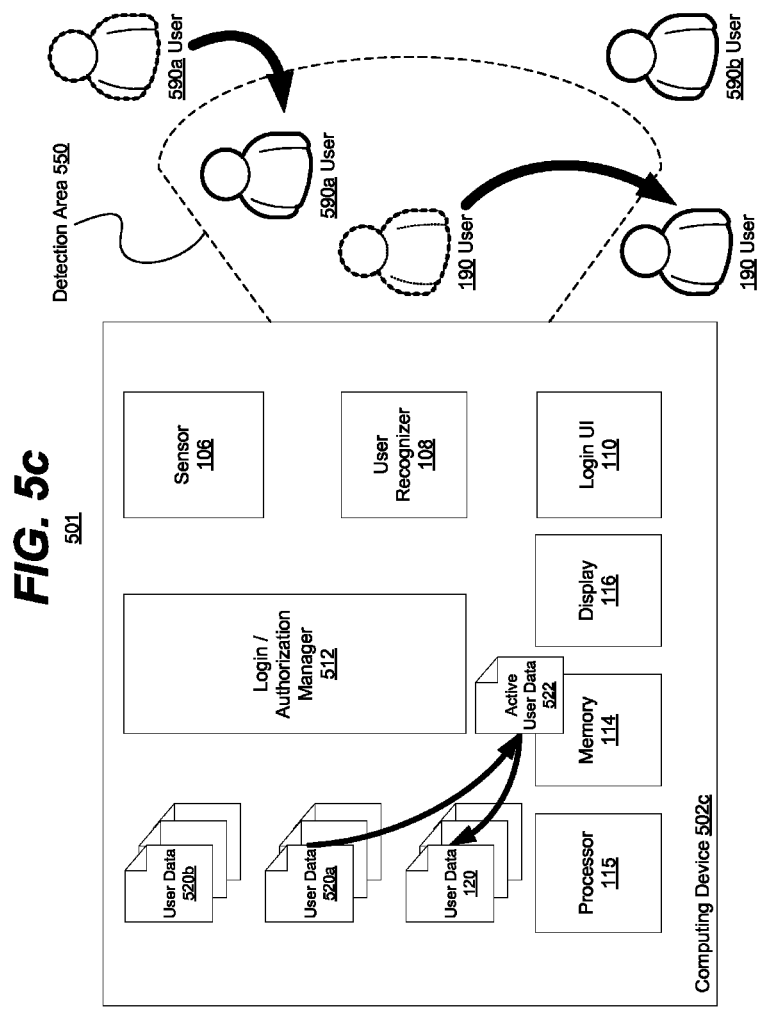

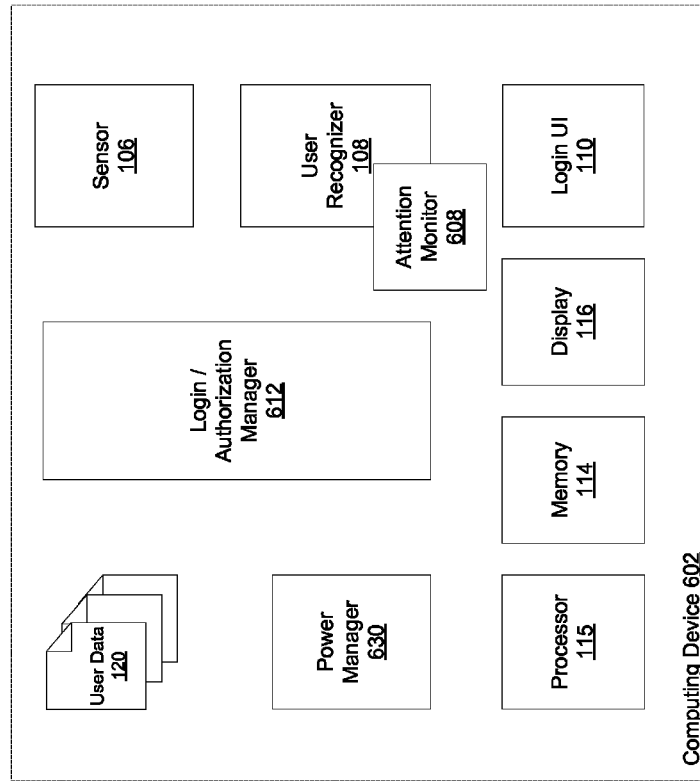

700

LOGIN TO A COMPUTING DEVICE BASED ON FACIAL RECOGNITION

CROSS-REFERENCE TO RELATED APPLICATIONS

This application claims priority under 35 U.S.C. 120 to, and is a continuation of, International Patent Application No. PCT/US12/49760, titled LOGIN TO A COMPUTING DEVICE BASED ON FACIAL RECOGNITION, and filed Aug. 6, 2012, which, in turn, is a continuation of U.S. patent application Ser. No. 13/247,652, titled LOGIN TO A COMPUTING DEVICE BASED ON FACIAL RECOGNITION, filed on Sep. 28, 2011, the disclosures of which are incorporated by reference herein in their entirety.

TECHNICAL FIELD

This description relates to authentication of a user to a computer and, in particular, to login to a computing device based on facial recognition.

BACKGROUND

In computer security, a login or logon (also called logging in or on and signing in or on) is generally the process by which individual access to a computer system is controlled by identification of the user using security credentials provided by the user. A user can log in to a system to obtain access to resources of the computer system and can then log out or log off (perform a logout/logoff) when the access is no longer needed. To log out is generally to close off one's access to resources of a computer system after having previously logged in.

Traditionally, computers or computing devices may be locked or otherwise secured to prevent unauthorized or inadvertent usage. Generally, a user is required to perform some affirmative action (e.g., enter a password, type a key combination, move the mouse, swipe a finger across the screen, etc.) to unlock the computer.

SUMMARY

In first general aspect, a method of logging a first user in to a computing device includes receiving an image of the first user via a camera operably coupled with the computing device and determining an identity of the first user based on the received image. If the determined identity matches a predetermined identity, then, based at least on the identity of the first user matching the predetermined identity, the first user is logged in to the computing device.

In another general aspect, a system for logging a first user in to a computing device can include a computer program product stored on a tangible computer readable medium and comprising instructions. When the instructions are executed they can cause a computer system to receive an image of the first user via a camera operably coupled with the computing device, determine an identity of the first user based on the received image, if the determined identity matches a predetermined identity, then, based at least on the identity of the first user matching the predetermined identity, log the first user in to the computing device.

In another general aspect, a computing device can include a camera configured for receiving an image of a first user, a user recognizer configured for determining an identity of the first user based on the received image, and a login manager configured to, if the determined identity matches a predetermined identity, login the first user in to the computing device based at least on the identity of the first user matching the predetermined identity.

Implementations can include one or more of the following features. For example, the camera can be physically integrated with the computing device. The computing device can include a phone.

Logging the first user in to the computing device can include permitting the first user to access first resources associated with the first user, but prohibiting the first user from accessing second resources associated with a second user, and the method can further include logging the first user out of the computing device, receiving a second image of a second user via a camera operably coupled with the computing device, determining an identity of the second user based on the received second image. And then, if the determined identity of the second user matches a predetermined identity, based at least on the identity of the second user matching the predetermined identity, the second user can be loggedin to the computing device, where logging the second user in to the computing device includes permitting the second user to access second resources associated with the second user, but prohibiting the second user from accessing the first resources associated with the first user.

If the determined identity matches a predetermined identity, the first user can be logged in to the computing device without requiring alphanumeric input from the user.

If the determined identity match does not match a predetermined identity, then the first user can be required to enter first alphanumeric information that matches first predetermined alphanumeric information and second alphanumeric information that matches second predetermined alphanumeric information, and the first user can be logged on to the computing device if the first alphanumeric information entered by the user matches the first predetermined alphanumeric information and if the second alphanumeric information matches the second predetermined alphanumeric information. If the determined identity match does match a predetermined identity, then the first user can be required to enter second alphanumeric information that matches the second predetermined alphanumeric information but the first user would not be required to enter first alphanumeric information that matches the first predetermined alphanumeric information. The first user can be logged on to the computing device if the second alphanumeric information matches the second predetermined alphanumeric information. The first predetermined alphanumeric information can include a username associated with the first user and the second predetermined alphanumeric information can include a password associated with the first user.

A plurality of images of the first user can be received via the camera, the plurality of images being taken from a plurality of different perspectives relative to the user's face, and determining the identity of the first user based on the plurality of received images.

A plurality of images of the first user can be received via the camera, the plurality of images including a facial gesture of the user, and the identity of the first user can be determined based on the plurality of received images and based on the facial gesture, and if the determined identity matches a predetermined identity, the first user can be logged in to the computing device.

Determining the identity of the first user based on the received image can include determining the identity of the first user based on one or more of: a relative position, size, and/or shape of the eyes, nose, cheekbones, and/or jaw of the user in the image of the user.

If the determined identity match does not match a predetermined identity, then requiring the first user to enter first alphanumeric information that matches first predetermined alphanumeric information as a condition for logging the first user on to the computing device. Then, if the determined identity match does match a predetermined identity, one or more gestures in a touch sensitive area of a computing device can be received. The gesture(s) received in the touch sensitive area can be compared to one or more predetermined device gestures stored in a memory, and the first user can be logged on to the computing device if the received gesture(s) match the predetermined gesture(s), without requiring the first user to enter alphanumeric information as a condition for logging the first user on to the computing device.

The method can further include, after logging the first user in to the computing device, receiving an image of a second user via the camera, determining an identity of the second user based on the received image of the second user, and if the determined identity of the second user does not match the predetermined identity that is matched by the identity of the first user, then logging the first user out of the computing device. If the determined identity of the second user matches a predetermined identity, then the second user can be logged in to the computing device based at least on the identity of the second user matching the predetermined identity.

The camera can be configured to receive a plurality of images of the first user, the plurality of images being taken from a plurality of different perspectives relative to the user's face, and the user recognizer can be configured to determine the identity of the first user based on the plurality of received images.

The details of one or more implementations are set forth in the accompanying drawings and the description below. Other features will be apparent from the description and drawings, and from the claims.

BRIEF DESCRIPTION OF THE DRAWINGS

FIG. 1 is a block diagram of an example implementation of a system in accordance with the disclosed subject matter.

FIG. 2 is a block diagram of an example implementation of an apparatus in accordance with the disclosed subject matter.

FIG. 3 is a block diagram of an example implementation of a system in accordance with the disclosed subject matter.

FIG. 4 is a block diagram of an example implementation of a system in accordance with the disclosed subject matter.

FIG. 5B is a block diagram of an example implementation of a system in accordance with the disclosed subject matter.

FIG. 5C is a block diagram of an example implementation of a system in accordance with the disclosed subject matter.

FIG. 6 is a block diagram of an example implementation of a system in accordance with the disclosed subject matter.

Like reference symbols in the various drawings indicate like elements.

DETAILED DESCRIPTION

Figure 5A:
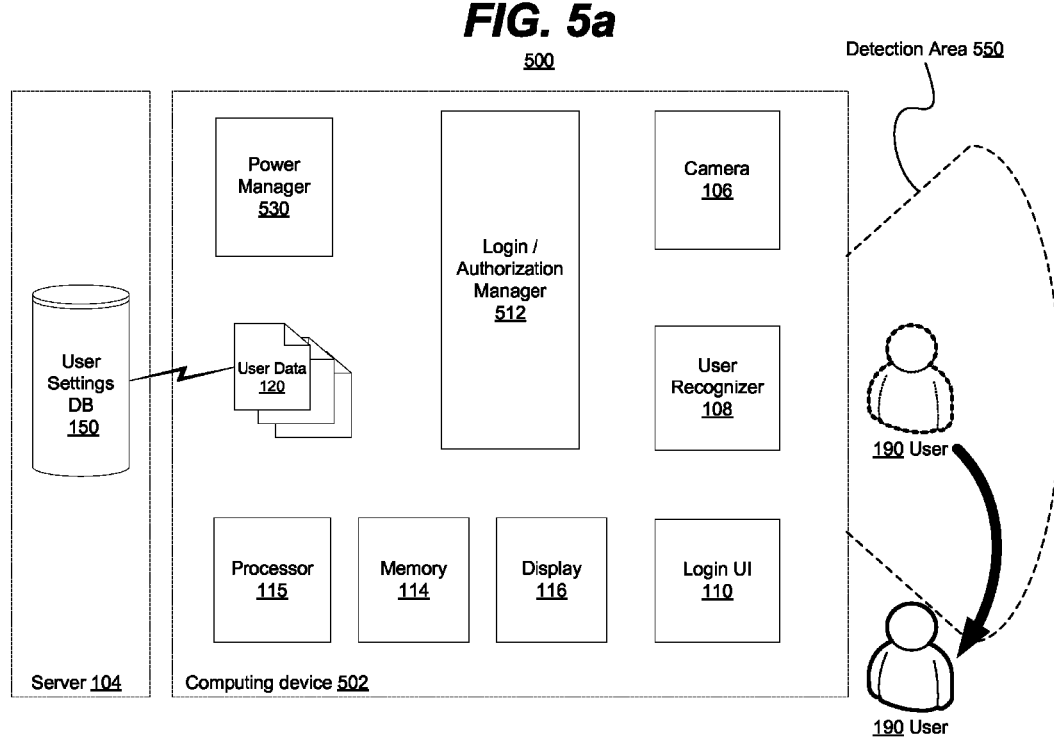
FIG. 5A is a block diagram of an example implementation of a system in accordance with the disclosed subject matter.

FIG. 1 is a block diagram of an example implementation of a system 100 in accordance with the disclosed subject matter. In one implementation, the system 100 may include a computing device 102 and a server 104. The computing device 102 may include a desktop computer, a laptop computer, a tablet computer, a netbook computer, a smartphone, etc. This computing device 102 may be used by a user 190 and may communicate over a network with the server 104. The computing device 102 may include a camera 106 that may be used to detect the presence of a user and to determine an identity of the user based on facial recognition technology. Then, the identity of the user can be compared with stored information of users that are authorized to log into the computing device 102 or that are authorized to use resources of the computing device 102. When a match is found between the determined identity and the stored information, the identified user can be logged into the computing device or permitted to use resources of the computing device 102.

In various implementations, the computing device 102 may include a processor 115 and a memory 114. In some implementations, the processor 115 may execute various softwares, firmwares, or a combination thereof. For example, in one implementation, the processor 115 may execute a login manager 112, a user recognizer 108, and/or the login user interface 110. In such an implementation, portions of the executed softwares may be stored within the memory 114.

In one illustrative implementation, when a user (e.g., user 190) is close to the computing device 102, the camera 106 may acquire a digital image of the user. The camera 106 may be integrated with and operably connected to the computing device 102, or the camera 106 may be separate from and operably connected to the computing device 102 (e.g., via a wired or wireless connection with the computing device). A processor 115 or user recognizer 108 executing on the processor 115 may analyze the digital image of the user to determine an identity of the user that is close to the computing device 102. For example, the user recognizer 108 may analyze the digital image of the user to determine such information as the size of the user's eyes, the distance between the user's eyes, the size and shape of the user's nose, the relative position of the user's eyes and nose, etc. This information can be compared to stored information about users that are authorized to use the computing device or its resources, and if a match is found the processor 115 or a login manager 112 executing on the processor may log the user into the computing device or permit the user to use the resources of the computing device 102.

In one implementation, the computing device 102 can be a desktop computing device or a notebook computing device that is shared by a number of different users. The computing device 102 can include a camera 106, which can be integrated into the computing device. For example, the camera can be integrated into a bezel of a display portion of the computing device 102 and can be directed perpendicular to the display device, such that it faces a user whose face is positioned in front of the display device.

The camera 106 can record images of objects in its field of view. The camera 106 can be configured to record images periodically, e.g. a fixed rate, or in response to movement within a zone in front of the camera, e.g., in response to a user moving into position in front of the camera, or in response to explicit input from a user, e.g., a user touching a key of a keyboard of the computing device 102. In one implementation, the camera 106 can be configured to record images at a low rate when activity is not detected within a zone in front of the camera and to record images at a higher rate when activity is detected within the zone. This may allow the camera to respond quickly to a user whose sits down in front of the computing device to use the device or to a user who walks away from the computing device but to avoid consuming computing resources at a high rate while the user is sitting in front of the computing device 102. In some implementations, the images recorded by the camera 106 can be discarded after a threshold amount of time has elapsed since the images were recorded (e.g., 5 minutes), and/or the images recorded by the camera can be discarded when the computing device is shut down or enters a low-power state.

The images recorded by the camera 106 can be received and analyzed by the user recognizer 108 to determine an identity of the user whose image is recorded. In various implementations, the user recognizer 108 may perform facial recognition on the images. For example, the user recognizer 108 may compare the facial features of the user 190, as detected by the camera 106 and analyzed by the user recognizer 108 with the facial features of a group of potential users. The comparison may include a comparison of other facial features that can be used to identify a user.

Various facial recognition techniques can be used. For example, techniques can be used that distinguish a face from other features in the camera's field of view and then measure the various features of the face. Every face has numerous, distinguishable landmarks, and different peaks and valleys that make up facial features. These landmarks can be used to define a plurality of nodal points on a face, which may include information about the distance between a user's eyes, the width of the user's nose, the depth of the user's eye sockets, the shape of the user's cheekbones, the length of the user's jaw line. The nodal points of user's face can be determined from one or more images of a user's face to create a numerical code, known as a faceprint, representing the user's face.

Facial recognition also can be performed based on three-dimensional images of the user's face or based on a plurality of two-dimensional images which, together, can provide three-dimensional information about a user's face. Three-dimensional facial recognition uses distinctive features of the face, e.g., where rigid tissue and bone is most apparent, such as the curves of the eye socket, nose and chin, to identify the user and to generate a faceprint of the user. The faceprint of a user can include quantifiable data such as a set of numbers that represent the features on a user's face.

A plurality of two-dimensional images of different points of view relative to the user's face also can be obtained and used to identify the user. This also may foil attempts to fool the facial recognition technology, such as by holding up a photograph of a user who is not actually present in front of the computing device 102.

After an identity of the user has been determined based on one or more images of the user, e.g., determined through a quantifiable faceprint that is generated of the user's face, the user recognizer 108 can compare the identity of the user to one or more predetermined identities. If a match is found between the determined identity and a predetermined identity, the login manager 112 may log the user into the computing device 102, so that the user may access one or more resources of the computing device 102. The predetermined identities can be stored by the computing device 102, for example, in one or more memories 114. The predetermined identities may include one or more images of users, quantifiable face print information of one or more users, or a subset of quantifiable face print information, wherein the subset is insufficient to reconstruct an image of the user.

The predetermined identities may be stored at the request of a user according to an opt-in process, for a user who wishes to take advantage of the facial recognition technology to log on to the computing device 102. For example, a default login procedure for a user may require the user to enter a first and second alphanumeric string, such as a username and a password. However, once the user has successfully logged in using a default login procedure the user may opt to have the computing device 102 store a predetermined identity associated with the user, so that during future logins the user make take advantage of a login procedure that is based on facial recognition technology, which may be less time consuming and less obtrusive to the user than entering a username and a password.

In another implementation, the user may opt to use the facial recognition technology to reduce, but not eliminate, the amount of alphanumeric input required as part of the login procedure to gain access to the resources of the computing device 102. For example, if a default login procedure requires a user to enter both first alphanumeric information (e.g., a username) and second alphanumeric information (e.g. a password), then the user may opt to utilize the facial recognition technology to eliminate the requirement to enter one of the pieces of alphanumeric information. In one implementation, if a match exists between the identity of the user determined by the facial recognition technology us in a stored predetermined identity, then the user may skip the step of entering the first alphanumeric information and may proceed to enter only the second alphanumeric information to login to the computing device 102.

In another implementation, which may be particularly useful for logging onto a device that includes a capacitively-coupled or resistively-coupled touch-sensitive input panel, the facial recognition technology also can be used to eliminate an amount of alphanumeric input required as part of a login procedure. For example, when an image of a user is received and the image corresponds to an identity that matches a predetermined identity, then a user may be required to input one or more gestures in a touch-sensitive area of the computing device. If the gestures entered by the user match one or more predetermined gestures, then the user can be logged in to the computing device without requiring the user to enter alphanumeric information as a condition for logging on to the computing device. However, if the received image corresponds to an identity that does not match a predetermined identity, then the user may be required to input particular alphanumeric information as a condition for logging on to the computing device. By using facial recognition technology to eliminate the need to enter alphanumeric information, users may find the process of securing and unsecuring a mobile computing device, such as a smart phone, less burdensome than if they needed to enter alphanumeric information to unlock the mobile computing device.

In another implementation, the facial recognition technology performed by the processor 115, the user recognizer 108, and the login manager 112 can be utilized to efficiently logon different users to a shared computing device 102. For example, multiple users (e.g. family members, coworkers, etc.) may share a computing device 102, and each user may have different user data 120 that is stored on the computing device 102 or stored on the server 104 and fetched from the server so that it can be used in connection with the computing device 102. The user data 120 may include, for example, documents, preferences, bookmarks and favorites, settings, etc. that is personal to a particular user. The act of logging a particular user into the computing device 102 can make the user data 120 associated with a particular user, but not the user data associated with other users, available to the particular user.

In some implementations, the user data 120 may be retrieved from a server 104 that houses a user settings database 150. In such an implementation, a user 190 may use a plurality of devices (e.g., computing device 102, etc.) and their user data 120 may be available regardless of which device is used. Once the computing device 102 has identified the user 190, the computing device 102 may request and subsequently download the user 190's user data 120 from the server 104.

To facilitate efficient transitions from one user to another, facial recognition technology can be used. For example, based on the identity of the first user (as determined by the facial recognition technology) matching the predetermined identity associated with the first user, the first user can be logon to the computing device. Upon logging in, the first user can be permitted to access first resources (e.g., user data 120) stored on the computing device and associated with the first user, while prohibiting the first user from accessing second resources associated with a second user. Then, when a second image of a face of a second user is received via the camera 106, an identity of the second user can be determined based on the received second image. If the identity of the second user matches a predetermined identity associated with the second user, then the second user can be logged into the computing device, and the second user can be permitted to access second resources stored on the computing device and associated with the second user, while prohibiting the second user from accessing the first resources associated with the first user. In this manner, multiple family members that share a computing device may simply present themselves to the computing device and have their individual user data 120 loaded automatically by the computing device, while also knowing that other family members will not have access to their individual user data when they are not logged in.

In one implementation, when a first user is logged into the computing device 102 and then an image of a second user is received that matches a predetermined identity, the user(s) can be prompted to confirm that the first user should be logged off of the computing device and that the second user should be logged on to the computing device, such that the computing device provides the second resources associated with the second user, while not providing the first resources associated with the first user. The confirmation may be provided to the computing device in a variety of forms. For example, a password associated with the second user may be required, as described above, or a mere keystroke (e.g., a tap on the "enter" key or on the "y" key may be required. In this manner, an accidental logout of the first user and login in the second user may be avoided.

In another implementation, when a user who is not authorized to use the computing device 102 attempts to use the device, an image of the person can be unauthorized user can be captured and stored in the device or sent to an authorized user of the computing device. For example, if an unauthorized user attempts to log onto and use the computing device but fails (e.g., if the unauthorized user enters incorrect username and password alphanumeric information), the camera 106 can record an image of the unauthorized user and store the image and the memory 114. In another implementation the recorded image can be sent to an authorized user. For example, the recorded image can be sent from the computing device 102 to the server 104, which may forward the recorded image to an account (e.g., an e-mail account) or device (e.g., a smart phone or mobile phone or other mobile device) to which the authorized user has access. Then, the authorized user can take appropriate measures in response to the login attempt by the unauthorized user.

In some implementations, the presence of a user may wake the computing device 102 from a dormant state. Such a dormant state may include a state or mode in which no user (e.g., user 190) is logged in to the device 102, or a low power mode such as a sleep mode or hibernation mode in which the device's 102 components or a portion thereof are powered off or down and most operating state is saved to the device's 102 memory 114, either volatile memory (e.g., for sleep mode) or non-volatile memory (e.g., for hibernation mode).

The device 102 may be configured to detect the presence of a user 190 when the user 190 approaches the computing device 102. In various implementations, the device 102 may include a proximity sensor 117 that is configured to detect the presence of a user (e.g., user 190). In a low power mode this proximity sensor or other detection sensor or 106 may be powered on or up, despite the majority of the device 102 being in a low power mode, in order to detect a user. In various implementations, the proximity sensor 117 may include a touchpad, mouse, capacitive sensor, conductive sensor, an infrared sensor, a motion-detector, etc. configured to sense presence or movement of the user 190 (e.g., via touch, etc.). Then, after the user's presence has woken the computing device 102 from its dormant state and identity of the user can be determined.

In one implementation, the device 102 may include a user recognizer 108 configured to, upon the detection of the presence of the user 190, determine the identity of the user 190. The user recognizer 108 may include hardware or software configured to compare features of an image received from the camera 106 to features associated with predetermined users.

In various implementations, the user recognizer 108 may compare the digital image of the user 190 to a list of possible users. The user recognizer 108 may select a user from among the list of potential users that most closely matches the detected user 190. Although, in some implementations, the user recognizer 108 may be configured to select none of the potential users if a sufficiently close match for the detected user 190 is not made, wherein the sufficiency of the match is judged by predefined criteria.

In such a situation in which no potential user matches the detected user 190, the computing device 102 may not log any user in to the computing device 102. Refraining from logging the detected user 190 in to the computing device 102 may include not removing the computing device 102 from, or returning the computing device 102 to, the low power state. In another implementation, the computing device 102 may load a set of default user settings, preferences or data 120, either in whole or in part. In one implementation, the computing device 102 may load a set of guest user settings. In such an implementation, the guest user settings may provide no, or a limited access to, data stored on the computing device 102. In such an implementation, the guest user settings may provide access to the Internet or provide an otherwise limited and restricted access to the computing device 102 and the capabilities of the computing device 102.

In various implementations, the user recognizer 108 may perform facial recognition based on the image recorded by the camera 106. In such an implementation, the user recognizer 108 may compare the facial features of the user 190, as detected by the camera 106, against the facial features of one or more potential users. The comparison may include a comparison of other body features. For example, the computing device 102 may calculate the user 190's height based upon a digital image captured by a camera. In another example, the computing device 102 may calculate the distance between the user 190's eyes or other biometric feature (e.g., eigenface analysis, etc.).

In one implementation, the device 102 may include a login manager 112 configured to access a given user's settings, preferences, etc. (collectively referred to as user data 120) and load them into the memory 114 of the device 102 or otherwise perform the operations to gain access, or login, to the device 102. In various implementations, the user data 120 may include data instructing the apparatus to, for example: mount various network drives, printers, and/or devices; establish various network connections; set a certain color scheme or graphical user interface (GUI) theme; load bookmarks or file and icon settings; volume and multimedia settings; saved passwords or authentication credentials; etc.

In another implementation, the user data 120 may include a list of applications, documents, files, or tabs which are to be opened or executed when the user 190 is logged into the computing device 102. In some implementations, these applications, documents, files, or tabs may have been open or actively executed when the user 190 was previously logged into such a computing device 102. In such an implementation, this user data 120 may allow or facilitate a user 190 to synchronize their working environment across multiple machines or apparatuses.

In various implementations, the login manager 112 may acquire the user data 120 from a remote server 104 that stores the user data 120 in a user settings database (DB) 150. In such an implementation, the remote server 104 may be configured to synchronize the user data 120 across a plurality of devices (e.g., computing device 102, etc.), as described above. In various implementations, the login manager 112 may be configured to update the remote server 104 or the user settings database (DB) 150 with any changes to the user data 120 that occur while the user 190 is logged in to the computing device 102.

As described above, in some implementations, the login process may require a password or other security credentials that entail an active involvement from the user 190. In such implementations, the device 102 may include a login user interface (UI) 110 configured to prompt the user 190 for their authorization credentials (e.g., password, etc.). The login manager 112 may speculatively load the user's user data 120 in anticipation of the proper presentation of the authorization or security credentials, such that if the user enters the proper authorization credentials the user data will already be loaded, or will be in the process of being loaded, so that the user will have quick access to his or her user data.

FIG. 2 is a block diagram of an example implementation of a computing device 202 in accordance with the disclosed subject matter. The computing device 202 may include a desktop computer, a laptop, a tablet, a netbook, a smartphone, etc. the computing device 202 may be similar to the computing device 102 of FIG. 1, except that a plurality of user data, each associated with a respective different user (e.g., user data 220a, 220b, and 220c, etc.), may be stored locally within the device 202. The user recognizer 108 may select or attempt to recognize the user 190 from among the users associated with the user data 220a, 220b, and 220c. In such an implementation, the plurality of user data may include data that may be employed to identify the detected user 190 (e.g., facial feature patterns, a photograph of the user 190, etc.).

In various implementations, if none of the user data is associated with the detected user 190, the login manager 112 may not pre-load or login the user 190 to the device 202, as described above. In one implementation, the login UI 110 may be present or may display to the user 190 a default log in screen or UI. Upon manually logging in to the computing device 202 through the default login screen or user interface (e.g., using a username and password or using no authorization credentials at all), the login manager 112 may create a new user data set for user 190.

In one implementation, the creation of a new user data set may be predicated upon user consent. In some implementations, a user can be prompted to explicitly allow the creation of the user data set and any data collection (e.g., storing the user data on a server 104, etc.). Further, the user may opt in/out of participating in such data collection activities. Furthermore, the collected data can be anonymized prior to performing data analysis, for example, to create a generic set of user data which may be employed to create a new user data set. For example, a generic set of user data may include encoded or encrypted information about patterns and features of a user's face, without, however, allowing an image of the user to be constructed from the encoded or encrypted data.

Alternatively, the login manager 112 may request a set of user data associated with the user 190 from a remote server upon which the user's 190 data is stored. The user's 190 data may be added to the locally stored set of user data (e.g., user data 220a, 220b, and 220c, etc.) and be employed in subsequent instances in which the user 190 attempts to be automatically logged in to the computing device 202.

In some implementations, a combination of the devices 102 and 202 of FIGS. 1 and 2, respectively, may exist. In such an implementation, some user data may be stored locally while other data may be stored remotely. Alternately, a first portion of a user data (e.g., icon placement, color schemes, etc.) may be stored locally and a second portion of the user data (e.g., active tabs, printer settings, drive mappings, etc.) may be stored remotely and even synchronized between various devices the user may make use of.

FIG. 3 is a block diagram of an example implementation of a system 300 in accordance with the disclosed subject matter. In one implementation, the system 300 may include an apparatus, electronic device, or computer 302. The computing device 302 may include a desktop computer, a laptop, a tablet, a netbook, a smartphone, etc.

Again, the apparatus 302 may be similar to the computing device 202 of FIG. 2. However, in FIG. 3, it is shown that, in one implementation, the user recognizer 108 may be configured to select a single user (e.g., user 190) from among a plurality of possible or potential users (e.g., users 390a and 390b) that are within the range of the camera 106 or the user recognizer 108.

In the illustrated implementation, the apparatus 302 may include a shared computer that is used by a family of users within a household. In another implementation, the apparatus 302 may be a shared computer in a workplace environment that is used by a number of employees. In such an implementation, the apparatus 302 may detect more than one potential user and select one of the potential users to login to the apparatus 302

In one such implementation, the user recognizer 108 may be configured to identify the user 190 closest to the device 302. In another implementation, the user recognizer 108 may be configured to associate the computing device 202 with a primary user (e.g., user 190) that is preferred or the primary user for the computing device 202. This primary user may be selected to be logged in, if the primary user is among the plurality of potential users. In various implementations, the user recognizer 108 may be configured to select one user from the plurality of potential users based upon a predefined set of criteria.

In various implementations, the identification of the user 190 may be based upon user habits. For example, a first user (e.g., user 190) may log into the apparatus 302 most often during certain periods of time (e.g., 8:00 pm to 10:00 pm). A second user (e.g., user 390a) may log into the apparatus 302 most often during a second period of time (e.g., 9:00 am to 1:00 pm). And, the third user (e.g., user 390b) may log into the apparatus 302 most often during a third period of time (e.g., 2:30 pm to 5:30 pm). Based upon these habits of the users 190, 390a, and 390b, the apparatus 302 may identify which of the potential and detected users to select as the primary user. Other user habits (e.g., based upon location, most recently used, frequency of use, etc.) may be employed by the apparatus 302 to select a user. It is also understood that such a user habit based identification technique may be employed when only a single user is identified. In such an implementation, user habits may provide for a number of likely candidate users and reduce (at least initially) the number of user candidates the apparatus 302 may attempt to match against the detected user.

FIG. 4 is a block diagram of an example implementation of a system 400 in accordance with the disclosed subject matter. In one implementation, the system 400 may include an apparatus, electronic device, or computing device 402, and a server 404. The computing device 402 may include a desktop computer, a laptop, a tablet, a netbook, a smartphone, etc.

The illustrated implementation, illustrates another means by which the apparatus 402 may identify the user 190. As described above in regard to FIGS. 1, 2, and 3, the apparatus may identify the user based upon biometric information, such as features of the user's face that are locally available within the computing device 402 or stored within a remote repository (e.g., on server 104, etc.). In the illustrated implementation, the identifying information may be found in a remote storage system. In various implementations, the identifying information may be stored in a distributed fashion (e.g., a social media site, a photo sharing site, etc.).

In one implementation, the user recognizer 108 may be configured to utilize user identifiers 406 stored within one or more servers 404 to recognize the detected user 190. Examples of user identifiers 406 may include photos, etc. from servers 404 or sites associated with the user 190. For example, the user recognizer 108 may be configured to check a company directory, social media site, or photo sharing site associated with a possible user or defined in a predetermined setting. The user recognizer 108 may compare photos found on the server(s) 404 with the a photo taken of user 190 while user 190 is waiting to be logged into the device 402. In various implementations, the user recognizer 108 may be configured to only check a limited list of possible users (e.g., users who have previously logged into the device 402, users within a company, etc.).

FIG. 5A is a block diagram of an example implementation of a system 500 in accordance with the disclosed subject matter. In one implementation, the system 500 may include an apparatus 502 used by a user 190, and a server 104. As described above, the apparatus 502 may include a processor 115, a memory 114, one or more cameras 106, a login user interface 110, and a user recognizer 108. In addition, in various implementations, the apparatus 502 may include a display or monitor 116 configured to graphically display information to the user 190.

In various implementations, the camera 106 may include or have a detection area 550 in which the camera 106 is configured to operate. For example, in the case of a camera 106 embedded in in a bezel portion of the display 116, the camera may have a field of vision, or more generally a "detection area 550", in front of the display 116 in a circular arc radiating, for example, approximately 2 meters from the camera 106. Therefore, the camera 106 may not be configured to detect things outside the camera 106's detection area 550 (e.g., things behind the display 116, etc.). In some implementations the range for the camera 106 may be controllable by the user 190, so that the camera can be configured to detect only users who are relatively close to the camera or to detect users who are farther away from the camera.

In the illustrated implementation, the user 190 may have already been detected and logged into the apparatus 502, as described above. As such, the user 190's user data 120 may have been loaded into the memory 114 or otherwise made available to the apparatus 502 as part of the logging in process, as described above. In some implementations, the user data 120 may have been altered or edited as part of the user 190's use of the apparatus 502. For example, the user 190 may have opened or closed various documents or tabs, changed configuration settings (e.g., email servers, network settings, etc.) or other forms of user data 120.

In the illustrated implementation, the user 190 may leave the camera 106's detection area 550. The camera 106 or apparatus 502 may detect this change in the user 190's status in regards to the apparatus 502. In this context, a "change in user status" may include a change in the user's presence (e.g., has the user walked away from the apparatus?, etc.), a change in the user's sole or shared use of the apparatus (e.g., does the user have sole access to the apparatus?, are multiple user's sharing the apparatus?, is a second individual or user able to eavesdrop or spy on the logged in user?, etc.), or a change in the user's attentiveness to the apparatus 502 (e.g., is the user actively using the apparatus 502 or merely in the camera's detection area?, etc.), etc.

In the illustrated implementation, the user 190 may leave the detection area 550 of the camera 106. For example, the user 190 may walk away from the apparatus 502. In such an implementation, the camera 106 or user recognizer 108 may detect this change in status of the user 190's relationship with the apparatus 550, as described above. In response to this change in the user 190's status, the login/authorization manager 612 may adjust the authorization level of the user 190.

For example, in one implementation, in response to the user 190 leaving the detection area 550 of the camera 106, the login/authorization manager 612 may log the user 190 out of the apparatus 502. In this context, logging the user 190 him him him himout of the apparatus 502 may be considered a way to adjust the user 190's authorization to use the apparatus 502. In such an implementation, this may include updating or synchronizing the user 190's user data 120 with the server 104. In such an implementation, when the user 190 logs back into an apparatus (e.g., apparatus 502 or another apparatus, etc.) the updated user data 120 may be employed to log the user 190 into the apparatus device. In the implementation in which the user 190's open applications, documents, etc. are included in the user data 120, the user 190 may be able to continue using the apparatus 502 (or other apparatus) essentially as if the user 190 had never been logged out In another implementation, in response to the user 190 leaving the detection area 550 of the camera 106, the login/authorization manager 512 may partially log the user 190 out of the apparatus 502. Again, in this context, partially logging the user 190 out of the apparatus 502 may be considered a way to adjust the user 190's authorization to use the apparatus 502. For example, the login UI 110 could remove the normal graphical information displayed via the display 116 (e.g., windows, documents, etc.) and instead display a login or a lock screen that requires the user 190 to re-authenticate themselves before the normal graphical information may be displayed via the display 116. In such an implementation, the user data 120 may or may not be synchronized with the server 104, depending upon the implementation. In various implementations, the re-authentication may occur automatically via the techniques described above in reference to FIGS. 1, 2, 3, and/or 4.

In another implementation, in response to the user 190 leaving the detection area 550 of the camera 106, the login/authorization manager 512 may place or transition the apparatus 502 to a reduced power state (e.g., the suspend power state, the hibernate power state, etc.). In this context, placing the apparatus 502 in a reduced power state may be considered adjusting the user 190's authorization to use the apparatus 502, as the user 190 may be limited in how they may use the apparatus 502 when the apparatus 502 is in the reduced power state. In various implementations, the login/authorization manager 512 may place or transition a portion of the apparatus 502 to a reduced power state. For example, the login/authorization manager 512 may turn off or reduce the brightness of the display 116 if the user 190 is not within the detection zone 550 or otherwise has a status in relation to the apparatus 502 in which it is unlikely that the user 190 will be looking at the display 116 (e.g., the user 190's back may be towards the apparatus 502, etc.). In various implementations, the apparatus 502 may include a power manager 530 which manages the transition of the apparatus 502 to and from various power modes. In such an implementation, the login/authorization manager 512 may request that the power manager 530 perform such a transition.

Conversely, if the user 190's status changes to a state in which it is likely that the user 190 will interact with the apparatus 502, the login/authorization manager 512 may remove or transition the apparatus 502 (or portion thereof) from the reduced power mode to the prior power mode or an active power mode (e.g., the working power mode, etc.). In various implementations, the status change detection and power mode transition may occur automatically via the techniques described above in reference to FIGS. 1, 2, 3, and/or 4.

In various implementations, the user 190 may also be authenticated into one or more security schemes. For example, the user 190 may have provided authentication or authorization details in order to access a network, various files (e.g., a network drive, encrypted files, etc.), software or web services (e.g., an employee database, a financial web site, etc.). In such an implementation, each of these services or files may employ different authorization schemes. For example, a first service may allow the user 190 authorization until the user 190 actively logs out of the apparatus 502; a second service may allow authorization as long as the user 190 is at the apparatus 502; etc. In such an implementation, the login/authorization manager 512 may selectively revoke the authorization of the user 190 based upon the respective rule systems or schemes employed by the plurality of services. For example, in the above example implementation, when the user 190 changes their status by leaving the detection zone 550, as detected by the camera 106 and/or the user recognizer 108, the login/authorization manager 512 may maintain the authorization to the first service (if moving out of the detection one 550 is not considered actively logging off the apparatus 550), but may revoke the authorization to the second service.

In this context, the term "secure service(s)" refers to one or more services (e.g., web sites, file access, apparatus usage access, etc.) that require authorization of the user 190 before those secure services may be used by the user 190, and which may also restrict or limit the way a user may use the secure service based upon the user's authorization level.

In various implementations, these authentication or authorization details for the secure services may be or have been provided automatically as part of the automatic login process, as described above. In another implementation, these authentication or authorization details may have been provided manually by the user 190 or automatically via other means (e.g., a cookie in a web browser, a username/password pair via a third-party authentication service, etc.). In some implementations, the authorization or the user 190 may be managed, in whole or in part, by the login/authorization manager 512.

In the illustrated implementation in which the login/authorization manager 512 may selectively revoke or adjust the authorization of the user 190 in relation to a plurality of secure services, the login/authorization manager 512 may alter how the portion of the graphical information associated with those secure services is displayed by display 116. For example, if a user 190 has a web site associated with a secure service contained or displayed in a GUI window, and the login/authorization manager 512 revokes the user 190's authentication for that secure service, the GUI window containing or displaying the secured and no-longer authorized web site may be closed, dimmed, made illegible, minimized, or otherwise obscured or removed from display by the display 116. Likewise, secured but no longer authorized files or documents may be closed or encrypted or obscured, such that the information contained therein may not be accessible to an un-authorized viewer (e.g., user 590a of FIG. 5B, as described below).

In various implementations, the login/authorization manager 512 may alter or adjust the authorization level of the user 190 to use the apparatus 502 based upon one or more rules. For example, the login/authorization manager 512 may alter or adjust the authorization level of the user 190 based upon the amount of time the user 190 has been absent from the detection zone 550. In one implementation, if the user 190 has only been absence from the detection area 550 for a relatively short period of time (e.g., 30 seconds, one minute, or two minutes, etc.) the login/authorization manager 512 may merely lock or turn off the display 116. Whereas, if the user 190 has only been absence from the detection area 550 for a relatively long period of time (e.g., five, minutes, 10 minutes, or 20 himminutes, etc.) the login/authorization manager 512 may log the user 190 out of the apparatus 502 and place the apparatus 502 in a reduced power mode (e.g., the suspend power mode, hibernate power mode, etc.).

In various implementations, the login/authorization manager 512 may base its decision to adjust the authorization level of the user 190 on whether various factors or measures exceed one or more thresholds. In some implementations, these influential factors or measures may include, but are not limited to: the availability of one or more system resources (e.g., battery power level, network bandwidth, network type, processor capacity, memory usage, storage availability, etc.), the consumption rate of one or more system resources, the amount of time the change in the user 190's status in regards to the apparatus has elapsed, the physical location of a user (e.g., user 190, user 590a of FIG. 5B, etc.), the physical location of the apparatus 502, etc.

FIG. 5B is a block diagram of an example implementation of a system 501 in accordance with the disclosed subject matter. In one implementation, the system 501 may include an apparatus 502b used by a user 190. As described above, the apparatus 502b may include a processor 115, a memory 114, a display 116, one or more cameras 106, a login/authorization manager 512, a login user interface 110, and a user recognizer 108. In various implementations, the camera 106 may include or have a detection area 550 in which the camera 106 is configured to operate, as described above.

In the illustrated implementation, the user 190 may have already been detected and logged into the apparatus 502b, as described above. As such, the user 190's user data 120 may have been loaded into the memory 114 or otherwise made available to the apparatus 502b as part of the logging in process, as described above. In some implementations, the user data 120 may have been altered or edited as part of the user 190's use of the apparatus 502b. For example, the user 190 may have opened or closed various documents or tabs, changed configuration settings (e.g., email servers, network settings, etc.) or other forms of user data 120.

In the illustrated implementation, the user 590a may enter the detection area 550. The addition of a second or additional user (e.g., user 590a or user 590b, if user 590b enters the detection area 550, etc.) may be regarded as a change in the status of the first user 190 in regards to the apparatus 502b. In such an implementation, the login/authorization manager 512 may alter or adjust the authorization of the first user 190 in regards to the apparatus 502b.

For example, in one implementation, the login/authorization manager 512 may dim or turn off the display 116 so that the new user 590a may not see information displayed by the display 116 which the user 590a is not authorized to see. Likewise, audio outputs or other outputs may be restricted. The restriction of these outputs may substantially revoke the authorization the first user 190 previously had to view the display 116, the audio output, or other outputs of the apparatus 502b.

In another implementation, the login/authorization manager 512 may determine the identity of the second user 590a. In some implementations, this may include accessing the user data 520a associated with the new user 590a. Based upon this identification, the /authorization manager 512 may determine the authorization level held by the second user 590a. The login/authorization manager 512 may compare the new user 590a's authorization level to the first user 190's authorization level. As described above, various authorization levels may exist for various secured services. In such an implementation, the login/authorization manager 512 may restrict usage of the apparatus 502b based upon the first authorization level of the first user 190 and the second authorization level of the second user 590a.

For example, in one implementation, the apparatus 502b may only dim or turn off the display 116 (or other output devices, etc.) if the information displayed by the display 116 is not authorized to be displayed by both user 190 and user 590a. In another implementation, the display 116 may only dim or obscure the portions of the display 116 (e.g., a GUI window, etc.) which includes information that is not authorized to be displayed by both user 190 and user 590a, while the portions which may be displayed to both users 190 and 590a may be unaltered or visible. In such an implementation, the login/authorization manager 512 may adjust the effective authorization level of the first user 190 from the user 190's actual authorization level to an authorization level corresponding to the intersection (in the parlance of set theory) of the authorization levels of all the users within the detection area 550 (e.g., user 190 and user 590a, etc.).

In another implementation, the login/authorization manager 512 may adjust the effective authorization level of the user 190 to the higher authorization level of either the user 190 or the user 590a. In another implementation, the login/authorization manager 512 may adjust the effective authorization level to the union (again in the parlance of set theory) of the authorization levels of users 190 and 590a. In various implementations, other rules or schemes for adjusting the authorization level of the user 190 and prohibiting the apparatus 502b from being used in a way that is consistent with he adjusted authorization level may be used.

In one implementation, if the user 590a leaves or becomes absent from the detection area 550 and user 190 is left alone in the detection area 550, the status of the user 190 in regards to the apparatus may have changed. In such an implementation, the login/authorization manager 512 may return or re-adjust the authorization level of the user 190 to the user 190's prior or natural authentication level. In another implementation, if an additional user (e.g., user 590b) enters the detection area 550, again the status of the user 190 may have changed, and the login/authorization manager 512 may again adjust the authorization level of the user 190 based upon the users within the detection area 550 (e.g., users 190, 590a, 590b, users 190 and 590b, etc.).

In various implementations, the detection of a change in the user 190's status in regards to the apparatus 502b may be triggered by both the detection of another user (e.g., user 590a, etc.) or the detection of the removal of presence another user, and a secondary consideration (e.g., a time element, etc.). For example, to generate a change in the status of the user 190, user 590a may have to both come within the detection area 550 and maintain a presence within the detection area 550 for a predefined number of minutes or seconds (e.g., 10 seconds, etc.). In such an implementation, the occurrence of "false positive" or other statistical error may be reduced. For example, it may be disconcerting to user 190 for the display 116 to suddenly be turned off merely because user 590b had walked by, inadvertently coming within the detection area 550 of apparatus 502b. In such an implementation, the login/authorization manager 512 may make use of some threshold value or hysteresis effect to reduce undesirable or frequent changes in the status of the user 190 in regards to the apparatus.

FIG. 5C is a block diagram of an example implementation of a system 501 in accordance with the disclosed subject matter. In one implementation, the system 501 may include an apparatus 502c used by a user 190. As described above, the apparatus 502c may include a processor 115, a memory 114, a display 116, one or more cameras 106, a login/authorization manager 512, a login user interface 110, and a user recognizer 108. In various implementations, the camera 106 may include or have a detection area 550 in which the camera 106 is configured to sense or operate, as described above.

In the illustrated implementation, the user 190 may have already been detected and logged into the apparatus 502c, as described above. As such, the user 190's user data 120 may have been loaded into the memory 114 or otherwise made available to the apparatus 502c as part of the logging in process, as described above. In the illustrated implementation, the user 190's user data 120 may be stored in or considered to be the active user data 522. In the illustrated implementation, the active user data 522 may include the user data for the user actively logged into the apparatus 502c. In some implementations, the user data 120 or 522 may have been altered or edited as part of the user 190's use of the apparatus 502c, as described above.

In the illustrated implementation, the user 590a may enter the detection area 550. The addition of a second or additional user (e.g., user 590a or user 590b, if user 590b enters the detection area 550, etc.) may be regarded as a change in the status of the first user 190 in regards to the apparatus 502c. In such an implementation, the login/authorization manager 512 may alter or adjust the authorization of the first user 190 in regards to the apparatus 502c, as described above in reference to FIG. 5B.

However, in the illustrated implementation, user 190 may then choose to leave the detection zone 550. In such an implementation, the absence of user 190 from the detection area 550 may generate a change in the status of the user 190 in regards to the apparatus 502c. As described above in reference to FIG. 5A, the login/authorization manager 512 may alter or adjust the authorization of the first user 190 by logging the user 190 out of the apparatus 502c. In various implementations, this may include removing the user 190's user data 120 from the active user data 522 status. In another implementation, the login/authorization manager 512 may lock (e.g., via a screen lock, a password re-authorization, etc.) the user 190 out of the apparatus 502c.

In one implementation, the user 590a may be alone in the detection area 550. In such an implementation, the login/authorization manager 512 may automatically determine the identity of the second user 590a and automatically log the second or new user 590a into the apparatus 502c, as described above in reference to FIGS. 1, 2, 3, and 4. In such an implementation, the user data 520a of the user 590a may be considered or made the active user data 522.

In various implementations, the user 190 may choose other means to log out or relinquish control of the apparatus 502c. For example, in one implementation, the user 190 may stay within the detection area 550 but move behind user 590a. For example, user 190 may get up from the chair in front of the apparatus 502c, user 590a may then sit down in that chair, and user 190 may stand behind user 590a. Conversely, in some implementations, the user 190 may actively log-out or lock themselves out of the apparatus 502c, as described above. In such an implementation, the login/authorization manager 512 may be configured to determine when the first user 190 has relinquished control of the apparatus 502c to a second user 590b.

In various implementations, the login/authorization manager 512 may be configured to replace the active user data 522 with the new, second user 590b's user data 520b, either in whole or part. For example, in one implementation, the login/authorization manager 512 may be configured to change the authorization level, which governs the uses and ways in which the apparatus 502c may be used, from the first user 190's authorization level to the second user 590b's authorization level, while maintaining the first user 190's configuration and setting user data 120 or a portion thereof as the active user data 522. In such an implementation, a manager or user with higher or greater authorization levels (e.g., user 590a, etc.) may temporarily access or use the apparatus 502c with their higher authorization level without fully logging the user 190 out of the apparatus 502c.

FIG. 6 is a block diagram of an example implementation of a system 600 in accordance with the disclosed subject matter. In one implementation, the system 600 may include an apparatus 602 used by a user 190. As described above, the apparatus 602 may include a processor 115, a memory 114, a display 116, one or more cameras 106, a login/authorization manager 612, a power manager 630, a login user interface 110, and a user recognizer 108. In various implementations, the camera 106 may include or have a detection area (not shown in FIG. 6) in which the camera 106 is configured to sense or operate, as described above.

In the illustrated implementation, the user 190 may have already been detected and logged into the apparatus 602, as described above. As such, the user 190's user data 120 may have been loaded into the memory 114 or otherwise made available to the apparatus 602 as part of the logging in process, as described above. In some implementations, the user data 120 may have been altered or edited as part of the user 190's use of the apparatus 602, as described above.

In one implementation, the camera 106 or the user recognizer 108 may be configured to monitor the attentiveness or the user 190 in regards to the apparatus. In this context, "attentiveness to the apparatus" may include listening or watching with some interest or concentration the output of the apparatus (e.g., the display 116, etc.) or inputting information or instructions into the apparatus 602 (e.g., via a keyboard, mouse, touchscreen, etc.). In such an implementation, the apparatus 602 may include an attention monitor 608 configured to monitor the attentiveness or the user 190 in regards to the apparatus. In various implementations, the attention monitor 608 may be included in the camera 106, user recognizer 108, login/authorization manager 612, or other component of the apparatus 602.

In various implementations, the attention monitor 608 may measure the user 190's attentiveness by monitoring the position or movement of the user 190's eyes, the orientation of the user's head (e.g., if the user 190 is looking at the apparatus 602 or looking away from the apparatus 602, etc.), the presence or absence of the user 190, as described above, the input rate of the user 190 (e.g., keystrokes or mouse movements per a given period of time, etc.), etc.

In various implementations, the attention monitor 608 may determine the attentiveness of the user 190 based upon one or more rules or threshold values. For example, if the user 190 looks away from the apparatus 602 for a relatively short period of time (e.g., 5 seconds, etc.), the attention monitor 608 may determine that the user 190 is still attentive to the apparatus 602. Conversely, if the user 190 looks away for a relatively long period of time (e.g., 1 minute, 5 minutes, etc.) the attention monitor 608 may determine that the user 190 is no longer attentive to the apparatus 602.

In one implementation, a change in the attentiveness of the user 190 to the apparatus 602 may be considered a change in the status of the user 190 in regards to the apparatus 602. In such an implementation, the login/authorization manager 612 may adjust the authorization level of the user 190, as described above (e.g., logging the user 190 out of the apparatus 602, placing the apparatus 602 in a low power mode, etc.). In various implementations, the login/authorization manager 612 may adjust the authorization level of the user 190, which may include pausing the execution of an application, de-authenticating the user 190 from one or more secure services, or placing one or more portions of the apparatus 602 in a reduced power mode, etc.

For example, in the illustrated implementation, if the user 190 turns his or her head away from the apparatus 602, the login/authorization manager 612 may turn off the display 116. When the attention monitor 608 detects that the user 190's status in regards to the apparatus 602 has again changed by turning the user 190's head back to the apparatus 602, the login/authorization manager 612 may adjust the user 190's authorization level by turning the display 116 back on.

In some implementations, the attention monitor 608 may determine attentiveness of the user 190 while taking into consideration the application(s) executing on the apparatus 602. For example, the thresholds or rules mentioned above may allow for more inattentiveness if the user 190 is executing a movie application as opposed to a word processing application. In such an implementation, the if the user 190 looks away for a relatively long period of time (e.g., 5 minutes, etc.) but a movie is playing on the apparatus 602, the attention monitor 608 may determine that the user 190 is still attentive to the apparatus 602. However, if the user 190 looks away for an extremely long period of time (e.g., 15 minutes, etc.) and a movie is playing on the apparatus 602, the attention monitor 608 may then determine that the user 190 is no longer attentive to the apparatus 602.

For example, in another implementation, the login/authorization manager 612 may pause the execution of a video application if the user 190 is looking away from the apparatus 602. But, the login/authorization manager 612 may decide not to pause the execution an audio application if the user 190 is looking away from the apparatus 602. Instead, the login/authorization manager 612 may decide to mute or pause the execution an audio application if the user 190 has walked away from the apparatus 602.

In yet another implementation, the login/authorization manager 612 may base how the authorization level of the user 190 is adjusted based upon the level of system resources available to the apparatus 602. For example, the login/authorization manager 612 may not turnoff the display 116 of the apparatus 602 is using an external power source (e.g., plugged into an electrical outlet, etc.). However, if the apparatus 602 is using a battery to supply electrical power the login/authorization manager 612 may more aggressive in reduced in the power consumption of the apparatus 602.

The use of facial recognition technology to determine the presence or attentiveness of the user may allow for a more dynamic switching of the device between high-power and low-power states than has been utilized in the past, which may result in energy savings and longer battery life for the device 602. For example, rather than basing the decision to switch the device 602 from a high-power to a low-power state on the expiration of a predetermined timeout period, the device 602 can be switched to a low-power state when the user 190 is no longer present in front of the device or when the user is no longer attentive to the device. Then, when the user 190 returns to the device, or is again attentive to the device 602, as determined by the camera 106, or the user recognizer 108, or the attention monitor 608, the device can be switched from the low-power state to the high-power state.

By conditioning the change to the low-power and from the high-power state on the automatic detection of the absence, or lack of attentiveness, of the user, the device 602 may be switched to the low-power state at appropriate times, when the user 190 really is not making use of the device 602, rather than on the expiration of a predetermined timeout. A predetermined timeout period device may sometimes correspond to a time when the user is still using the device, thus interfering with the user's experience, and at other times may correspond to a time long after the user has ceased using the device, thus wasting energy or battery life. Therefore, automatically transitioning the device 602 from a high-power state to a low-power state based on the detection of the absence, or lack of attentiveness, the user may result in greater energy efficiency of the device 602.

Similarly, using the facial recognition technology provided by the camera 106, the user recognizer 108, and the attention monitor 608 to automatically transition the device 602 from a low-power state to a high-power state provides a better, more seamless experience to the user, because the user may not need to enter alphanumeric information, or to depress any keys of the device 602 to transition the device from the low-power state to the high-power state. Because the experiences more seamless for the user, transitions between the low-power state and the high-power state are less disruptive to the user, and therefore the user may be more willing to utilize energy-saving power management techniques provided by the device 602.

Figure 7:
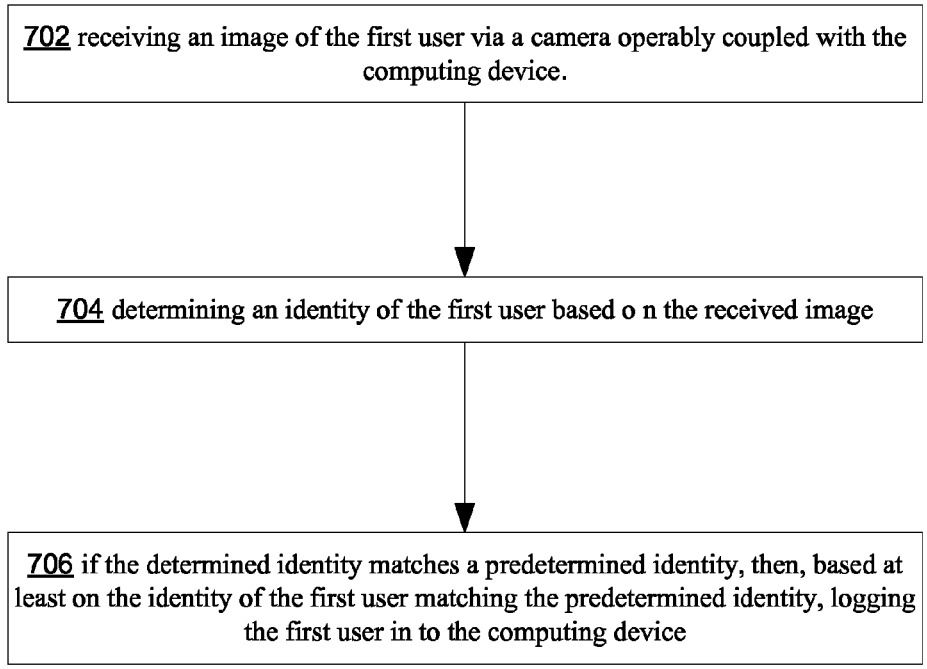
FIG. 7 is a flowchart of an example implementation of a technique in accordance with the disclosed subject matter.

FIG. 7 is a flow chart of an example implementation of a technique in accordance with the disclosed subject matter. In various implementations, the technique 800 may be used or produced by the systems such as those of FIG. 1, 2, 3, 4, 5, 6 or 10. It is understood that the disclosed subject matter is not limited to the ordering of or number of actions illustrated by technique 800.

Block 702 illustrates that, in one implementation, an image of the first user can be received via a camera operably coupled with a computing device, as described above. Block 704 illustrates that, in one implementation, an identity of the first user can be determined based on the received image. Block 706 illustrates that, in one implementation, if the determined identity matches a predetermined identity, then, the first user can be logged into the computing device based at least on the identity of the first user matching the predetermined identity.

Figure 8:
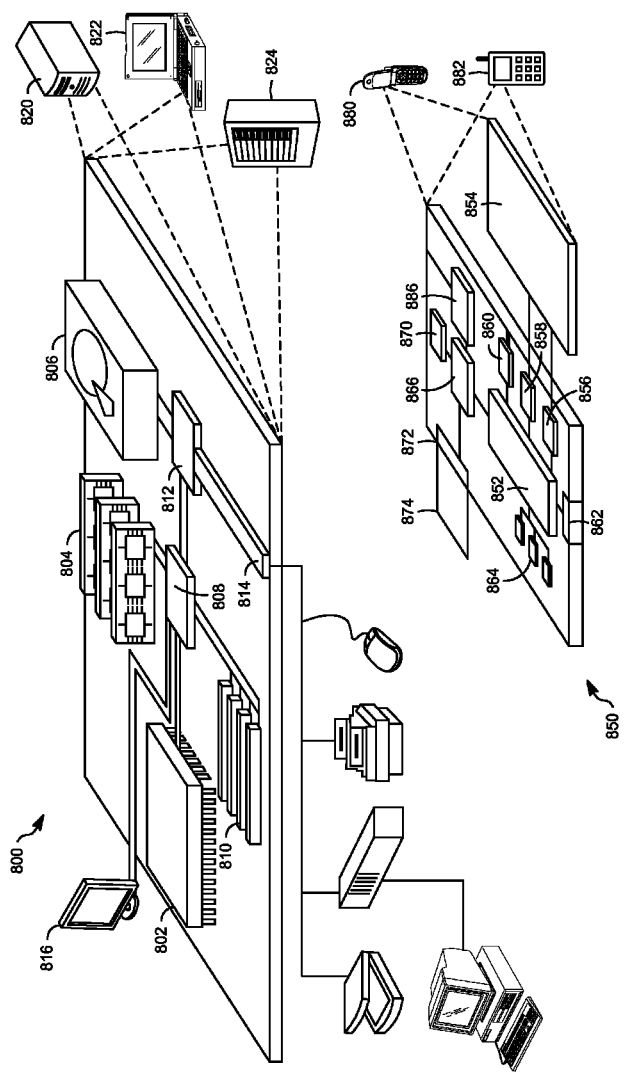
FIG. 8 shows an example of a computer device and a mobile computer device that can be used to implement the techniques described here.

FIG. 8 shows an example of a generic computer device 800 and a generic mobile computer device 850, which may be used with the techniques described here. Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smart phones, and other similar computing devices. The components shown here, their connections and relationships, and their functions, are meant to be exemplary only, and are not meant to limit implementations of the inventions described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 804, the storage device 806, or memory on processor 802.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 886, among other components. The device 850 may also be provided with a storage device, such as a microdrive or other device, to provide additional storage. Each of the components 850, 852, 864, 854, 866, and 886 are interconnected using various buses, and several of the components may be mounted on a common motherboard or in other manners as appropriate.

The processor 852 can execute instructions within the computing device 850, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD (Thin-Film-Transistor Liquid Crystal Display) or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provide in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 can be implemented as one or more of a computer-readable medium or media, a volatile memory unit or units, or a non-volatile memory unit or units. Expansion memory 874 may also be provided and connected to device 850 through expansion interface 872, which may include, for example, a SIMM (Single In Line Memory) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provide as a security for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, or memory on processor 852, that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, WiFi, or other such transceiver (not shown). In addition, GPS (Global Positioning System) receiver 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smart phone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A method of providing access to resources, through a computing device, to a plurality of users, the method comprising:
   receiving a first image of a first user via a camera operably coupled with the computing device;
   determining, based at least in part on the received first image, whether an identity of the first user matches a predetermined identity;
   if the identity of the first user matches a predetermined identity, then, based at least on the identity of the first user matching the predetermined identity, providing access, through the computing device, to first user data associated with the first user, wherein the first user data includes documents, preferences, bookmarks, favorites, and/or settings that are associated with the first user, but prohibiting access to user data associated with other ones of the plurality of users;
   receiving a second image of a second user via the camera;
   determining, based at least in part on the received second image, whether an identity of the second user matches a predetermined identity;
   if the identity of the second user matches a predetermined identity, then, based at least on the identity of the second user matching the predetermined identity:
      issuing a prompt to confirm that access to the second user data should be provided and that the access to the user data associated with other ones of the plurality of the users, including the first user data associated with the first user, should be prohibited;
      receiving a valid confirmation in response to the prompt; and
      in response to receiving the valid confirmation, providing access, through the computing device, to second user data associated with the second user, wherein the second user data includes documents, preferences, bookmarks, favorites, and/or settings that are associated with the second user, and prohibiting the access to user data associated with other ones of the plurality of users, including the first user data associated with the first user.

2. The method of claim 1, wherein the camera is physically integrated with the computing device.

3. The method of claim 1, further comprising:
   if the identity of the second user does not match a predetermined identity, then prompting the second user to enter first alphanumeric information that matches first predetermined alphanumeric information and second alphanumeric information that matches second predetermined alphanumeric information, and providing access to the second user data when the first alphanumeric information entered by the user matches the first predetermined alphanumeric information and when the second alphanumeric information matches the second predetermined alphanumeric information, and
   wherein, when the identity of the second user does match a predetermined identity, the prompt to confirm that access to the second user data should be provided and that access to the user data associated with other ones of the plurality of the users, including the first user data associated with the first user, should be prohibited, includes a prompt to provide one or more gestures in a touch sensitive area of the computing device, and
   wherein the valid confirmation includes a determination that the provided one or more gestures match one or more predetermined gestures.

4. The method of claim 1, further comprising:
   if the identity of the first user matches a predetermined identity, providing access to the first user data without requiring alphanumeric input to the computing device.

5. The method of claim 1, further comprising:
   if the identity of the second user does not match a predetermined identity, then prompting the second user to enter first alphanumeric information that matches first predetermined alphanumeric information and second alphanumeric information that matches second predetermined alphanumeric information, and providing access to the second user data when the first alphanumeric information entered by the user matches the first predetermined alphanumeric information and when the second alphanumeric information matches the second predetermined alphanumeric information, and
   if the identity of the second user does match a predetermined identity, then prompting the second user to enter the second alphanumeric information that matches the second predetermined alphanumeric information but not requiring the second user to enter first alphanumeric information that matches the first predetermined alphanumeric information, and providing access to the second user data when the second alphanumeric information matches the second predetermined alphanumeric information.

6. The method of claim 5, wherein the first predetermined alphanumeric information includes a username associated with the second user and the second predetermined alphanumeric information includes a password associated with the second user.

7. The method of claim 1, further comprising:
receiving a plurality of two-dimensional images of the first user via the camera, the plurality of two-dimensional images being taken from a plurality of different perspectives relative to the user's face, wherein the plurality of two-dimensional images, in combination, provide three-dimensional information about the user's face; and
determining the identity of the first user based on the three-dimensional information about the user's face provided by the plurality of received two-dimensional images.

8. The method of claim 1, further comprising:
receiving a plurality of images of the first user via the camera, the plurality of images, in combination, defining a facial gesture of the user; and
determining the identity of the first user based on the plurality of received images and based on the facial gesture.

9. The method of claim 1, wherein the computing device includes a phone.

10. The method of claim 1, further comprising determining the identity of the first user based on one or more of: a relative position, size, and/or shape of the eyes, nose, cheekbones, and/or jaw of the user in the image of the user.

11. A computer program product for of providing access to resources, through a computing device, to a plurality of users, the computer program product being stored on a non-transitory tangible computer readable medium and comprising instructions that, when executed, cause a computer system to:
receive a first image of a first user via a camera operably coupled with the computing device;
determine, based at least in part on the received first image, whether an identity of the first user matches a predetermined identity;
if the identity of the first user matches a predetermined identity, then, based at least on the identity of the first user matching the predetermined identity, provide access, through the computing device, to first user data associated with the first user, wherein the first user data includes documents, preferences, bookmarks, favorites, and/or settings that are associated with the first user, but prohibit access to user data associated with other ones of the plurality of users;
receive a second image of a second user via the camera;
determine, based at least in part on the received second image, whether an identity of the second user matches a predetermined identity;
if the identity of the second user matches a predetermined identity, then, based at least on the identity of the second user matching the predetermined identity:
issue a prompt to confirm that access to the second user data should be provided and that the access to the user data associated with other ones of the plurality of the users, including the first user data associated with the first user, should be prohibited;
receive a valid confirmation in response to the prompt; and
in response to receiving the valid confirmation, provide access, through the computing device, to second user data associated with the second user, wherein the second user data includes documents, preferences, bookmarks, favorites, and/or settings that are associated with the second user, and prohibit the access to user data associated with other ones of the plurality of users, including the first user data associated with the first user.

12. The computer program product of claim 11, wherein the instructions, when executed, further cause the computer system to:
if the identity of the second user does not match a predetermined identity, then prompt the second user to enter first alphanumeric information that matches first predetermined alphanumeric information and second alphanumeric information that matches second predetermined alphanumeric information, and provide access to the second user data when the first alphanumeric information entered by the user matches the first predetermined alphanumeric information and when the second alphanumeric information matches the second predetermined alphanumeric information, and
wherein, when the identity of the second user does match a predetermined identity, the prompt to confirm that access to the second user data should be provided and that access to the user data associated with other ones of the plurality of the users, including the first user data associated with the first user, should be prohibited, includes a prompt to provide one or more gestures in a touch sensitive area of the computing device, and
wherein the valid confirmation includes a determination that the provided one or more gestures match one or more predetermined gestures.

13. The computer program product of claim 11, wherein the instructions, when executed, further cause the computer system to:
if the identity of the second user does not match a predetermined identity, then prompt the second user to enter first alphanumeric information that matches first predetermined alphanumeric information and second alphanumeric information that matches second predetermined alphanumeric information, and provide access to the second user data when the first alphanumeric information entered by the user matches the first predetermined alphanumeric information and when the second alphanumeric information matches the second predetermined alphanumeric information, and
if the identity of the second user does match a predetermined identity, then prompt the second user to enter the second alphanumeric information that matches the second predetermined alphanumeric information without requiring the second user to enter first alphanumeric information that matches the first predetermined alphanumeric information, and provide access to the second user data when the second alphanumeric information matches the second predetermined alphanumeric information.

14. The computer program product of claim 13, wherein the first predetermined alphanumeric information includes a username associated with the second user and the second predetermined alphanumeric information includes a password associated with the second user.

15. The computer program product of claim 11, wherein the instructions when executed further cause the computer system to:

receive a plurality of two-dimensional images of the first user via the camera, the plurality of two-dimensional images being taken from a plurality of different perspectives relative to the user's face, wherein the plurality of two-dimensional images, in combination, provide three-dimensional information about the user's face; and determine the identity of the first user based on the three-dimensional information about the user's face provided by the plurality of received two-dimensional images.

16. A computing device for providing access to resources, to a plurality of users, the computing device comprising:

a camera configured for receiving a first image of a first user and for receiving receiving a second image of a second user via a camera operably coupled with the computing device;

a user recognizer configured for determining, based at least in part on the received first image, whether an identity of the first user matches a predetermined identity and for determining, based at least in part on the received second image, whether an identity of the second user matches a predetermined identity; and a login manager configured for:
if the identity of the first user matches a predetermined identity, then, based at least on the identity of the first user matching the predetermined identity, providing access, through the computing device, to first user data associated with the first user, wherein the first user data includes documents, preferences, bookmarks, favorites, and/or settings that are associated with the first user, but prohibiting access to user data associated with other ones of the plurality of users;

if the identity of the second user matches a predetermined identity, then, based at least on the identity of the second user matching the predetermined identity:

issuing a prompt to confirm that access to the second user data should be provided and that the access to the user data associated with other ones of the plurality of the users;

including the first user data associated with the first user, should be prohibited; receive a valid confirmation in response to the prompt; and in response to receiving the valid confirmation, providing access, through the computing device, to second user data associated with the second user, wherein the second user data includes documents, preferences, bookmarks, favorites, and/or settings that are associated with the second user, and prohibiting the access to user data associated with other ones of the plurality of users, including the first user data associated with the first user.

17. The computing device of claim 16, wherein the camera is physically integrated with the computing device.

18. The computing device of claim 16,
wherein the camera is configured to receive a plurality of two-dimensional images of the first user via the camera, the plurality of two-dimensional images being taken from a plurality of different perspectives relative to the user's face, wherein the plurality of two-dimensional images, in combination, provide three-dimensional information about the user's face; and wherein the user recognizer is configured to determine the identity of the first user based on the three-dimensional information about the user's face provided by the plurality of received two-dimensional images.

* * * * *